Figure 1:
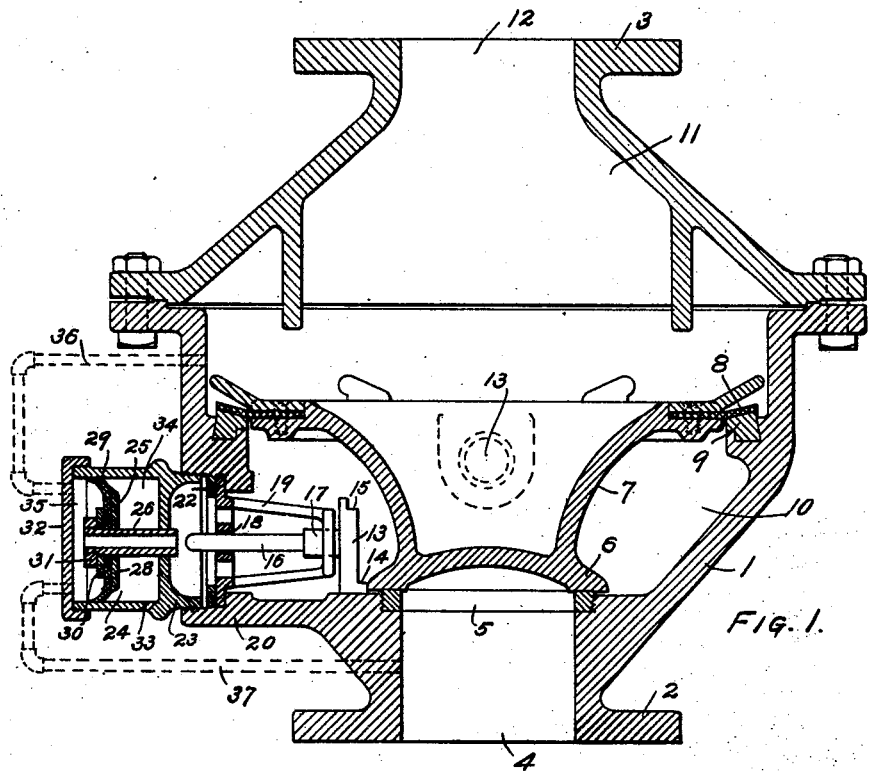

No. 688,427.

J. C. MELOON.
VALVE.
(Application filed Mar. 1, 1898.)

Patented Dec. 10, 1901.

(No Model.)

WITNESSES:
R. A. Bates
Ira L. Fish

INVENTOR,
Jonathan C. Meloon
BY Wilmarth H. Thurston
ATT'Y.

UNITED STATES PATENT OFFICE.

JONATHAN C. MELOON, OF PROVIDENCE, RHODE ISLAND, ASSIGNOR TO THE GENERAL FIRE EXTINGUISHER COMPANY, OF NEW YORK, N. Y., A CORPORATION OF NEW YORK.

VALVE.

SPECIFICATION forming part of Letters Patent No. 688,427, dated December 10, 1901.

Application filed March 1, 1898. Serial No. 672,151. (No model.)

*To all whom it may concern:*

Be it known that I, JONATHAN C. MELOON, of the city and county of Providence and State of Rhode Island, have invented certain new and useful Improvements in Valves; and I do hereby declare the following specification, taken in connection with the accompanying drawings, forming a part of the same, to be a full, clear, and exact description thereof.

The invention relates to that class of valves in which a liquid, usually water, under pressure is held in check by a valve which is held to its seat by the action of a less pressure and is released and forced from its seat by the action of the liquid when said light pressure is reduced. Such valves are especially useful in connection with automatic sprinkler systems in which the water is held in check by a valve held to its seat by the action of a light air-pressure in the system, and the present invention is especially designed for use in connection with such systems, although its use is not confined thereto.

Valves of the above class are usually provided with a movable member which is subjected upon one side to the light pressure in the system and upon the other side to a less pressure, usually about atmospheric, said movable member being arranged to hold the valve closed by reason of its greater area or by reason of the connections between said member and the valve. When such a valve is opened by the reduction of the light pressure in the system, the system is filled with water and a column of water is formed above the movable member. Should the valve for any reason now return to its seat, the column of water above the movable member may be of sufficient height to hold the valve to its seat and prevent any further flow of water to the system. A valve thus held to its seat is said to be "columned." With this class of valves it is desirable, especially in connection with fire-extinguisher systems where it is essential that the supply of water shall not be prematurely shut off after the valve has been opened by the opening of a sprinkler, to provide means for preventing columning.

The object of this invention is to provide simple and efficient means for preventing columning of the valve after it has once opened, and this is accomplished by providing means for preventing the closing of the valve after it has once opened, which means is operated by fluid-pressure. This means preferably consists of a stop or latch operated by a movable member which is subjected upon one side to a fluid-pressure and by its movement operates the stop. The movable member may be in the form of a piston or a diaphragm or of any other suitable form and may be acted upon at all times by the fluid-pressure, or may be acted upon by the fluid-pressure only upon the opening of the valve, the stop in the former case being prevented from operating until the valve opens, when it is released and operated by the action of the fluid-pressure upon the movable member. It is preferred, however, to so construct and arrange the parts that the movable member is not subjected to the fluid-pressure until the valve opens.

In the accompanying drawings the invention is shown in connection with a differential valve similar to that shown in Figure 1 of Patent No. 372,220, dated October 25, 1887; but it will be understood that the invention may be used with equal advantage in connection with the various forms of valves, wherein a liquid under pressure is held in check by a valve which is held closed by the action of a less pressure.

Figure 2:
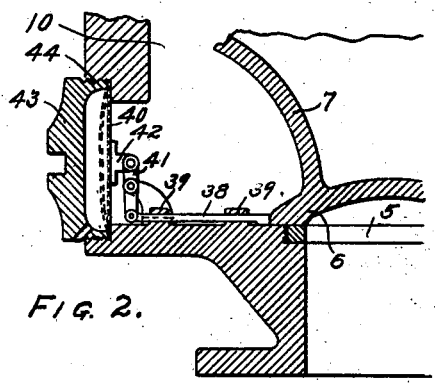

Referring to the drawings, Fig. 1 is a sectional view of a valve embodying the present invention, and Fig. 2 is a detail view showing a modification.

Referring to Fig. 1, 1 is the valve-casing, provided with flanges 2 and 3 for connecting said casing to a supply-pipe and delivery-pipe, respectively. The inlet 4 is provided with a valve-seat 5 for a valve 6. The valve 6 is formed on a dish-shaped member 7, which is provided with a flexible ring 8, arranged to seat upon the valve-seat 9. In this form of valve the member 7 and the wall of the casing 1 between the valve-seats 5 and 9 form an intermediate or supplemental chamber 10 and the space above the member 7 forms a light pressure-chamber 11, which is connected with the system through the outlet 12. The chamber 10 is preferably connected with the atmosphere through the usual drip-pipe 13; but the pressure in said chamber may, if desired, be either above or below atmospheric pressure, provided said pressure is less than the pressure in chamber 11. The walls of the movable member 7 between the chambers 10 and 11 are subjected to light pressure on one side and to a less pressure on the other side, and the member 7 is connected to the main valve by being formed integral therewith. The valve-seat 9 is of such a diameter that the pressure upon the top of the member 7 exerted by the light pressure will be sufficient to hold the valve 6 to its seat.

As thus far described the valve is of a well-known construction in common use and is merely shown as an illustration of one of many forms of valves to which the invention may be applied. The means for preventing columning of the valve embodying the present invention will now be described.

Referring to Fig. 1, a latch or stop consisting of the block 13 is arranged adjacent the valve-seat 5 and is provided with a lip or shoulder 14, adapted to pass under the valve when said valve opens, and thus prevent the closing of the valve. The block is provided with a second shoulder 15, adapted to pass under the valve should it open to its full extent. The block 13 is secured to or formed upon the end of a sliding bar 16, which is guided in bearings 17 and 18, formed in a frame 19. The frame is provided with a flange 20, which fits within an opening 21, formed in the valve-casing, and is held therein by a screw ring or nut 22. A cylindrical plug 23, in which is formed a chamber 24, is also screwed into the recess 21. A cap 32 closes the outer end of the chamber 24 and a vent 33 leads from the inner end of said chamber to the atmosphere. A movable member in the form of a piston 25 works in the chamber 24 and is secured to the end of a tubular rod 26, which extends through the end 27 of the plug 23 and is arranged to engage the end of bar 16. The piston 25 consists of a plate 28, secured to the rod 26, and a flexible disk 29, held between said plate and a washer 30 by the action of a nut 31. The chamber 24 is thus divided by the piston 25 into two chambers 34 and 35, the chamber 35 communicating with the intermediate or supplemental chamber 10 through the hollow rod 26 and the chamber 34 communicating with the atmosphere through the vent 33.

In the normal position of the parts the piston is not subjected to pressure upon either side, since both the chambers 34 and 35 are open to the atmosphere, chamber 34 through opening 33 and chamber 35 by reason of the passage through rod 26 to the chamber 10. When the valve 6 opens, however, the water flows into chamber 10 and through the passage in rod 26 into chamber 35, thus subjecting the piston to pressure and forcing said piston forward. This forward movement of the piston forces the end of rod 26 against the bar 16 and moves the shoulder 14 or 15 under the edge of the valve and prevents the valve from returning to its seat. Instead of forming a passage from the chamber 35 to the chamber 10 a passage may be formed from the chamber 11 or from the system to the chamber 35, as by a pipe 36, (indicated in dotted lines.) In this case the piston 25 is subjected to the action of the light air-pressure in the system and is held in check by the engagement of the block 13 with the edge of the valve. When the valve opens, the piston 25 is free to move forward under the action of the water which enters the chamber 35 through pipe 36. In lieu of either the passage from chamber 10 or chamber 11 a passage may be formed from the supply to the chamber 35, as by a pipe 37. (Indicated in dotted lines.) In this case the piston 35 is held against the pressure of the water in the chamber 35 by the engagement of the block 13 with the edge of the valve. When the valve opens, however, the block 13 is free to move forward a short distance, and is thus moved by the pressure in chamber 35 acting through the piston 25, rod 26, and bar 16.

In Fig. 2 is shown a modification of the invention. In this embodiment of the invention the means for preventing the closing of the valve consists of a stop-bar 38, mounted to slide in bearings 39 and arranged to pass under the edge of the valve 6 when said valve opens. This bar is operated by a movable member in the form of a diaphragm 40, which is operated by fluid-pressure upon the opening of the valve. The diaphragm is connected to the bar by means of a lever 41, one end of which is pivoted to the bar and the other end to a block 42, secured to the diaphragm. The diaphragm 40 is held in an opening in the casing 1 by a plug 43, provided with an annular flange 44, which holds the diaphragm against the shoulder 45. The space back of the diaphragm is open to the atmosphere through a passage 46. When the valve 6 opens, the water from the supply enters the chamber 10 and acts to force the diaphragm 40 outward. This movement of the diaphragm rocks the lever 41 and moves the bar 38 under the edge of the valve 6, so that said valve cannot return to its seat.

What I claim as my invention, and desire to secure by Letters Patent, is—

1. The combination with a valve, of devices operated by fluid-pressure when the valve opens for preventing the valve from closing.

2. The combination with a valve, of a stop for preventing the closing of the valve, and means for operating said stop by fluid-pressure.

3. The combination with a valve, of means for holding said valve closed, and means operated by fluid-pressure when the valve opens for preventing the valve from closing.

4. The combination with a valve, of means for holding said valve closed against pressure by the action of a less pressure and means operated by a fluid under pressure for preventing the valve from closing.

5. The combination with a valve, of means for holding said valve closed against pressure by the action of a less pressure, and a stop operated by a fluid under pressure for preventing the valve from closing.

6. The combination with a valve, of means for holding said valve closed against pressure by the action of a less pressure, means for preventing the closing of the valve, and means subjected to fluid-pressure upon the opening of the valve for operating said preventing means.

7. The combination with a valve, of means for holding said valve closed, a stop for preventing the closing of the valve, and means subjected to fluid-pressure upon the opening of the valve for operating said stop.

8. The combination with a valve, of means for holding said valve closed against pressure by the action of a less pressure, a stop for preventing the closing of the valve, a movable member subjected to fluid-pressure upon the opening of the valve, for operating said stop.

9. The combination with an inlet for a fluid under pressure, a valve for closing said inlet, a chamber adapted to be connected with the system, a supplemental chamber, a movable member between said chambers for holding the valve to its seat by the action of the pressure in the system, a stop for preventing the valve from closing, a chamber communicating with the supplemental chamber, a movable member in said chamber for operating said stop.

10. The combination with an inlet for fluid under pressure, a valve for closing said inlet, a chamber adapted to be connected to the system, a supplemental chamber, a movable member between said chambers for holding the valve closed by the action of the pressure in the system, a stop for preventing the closing of the valve, a movable member subjected to the pressure in the supplemental chamber for operating said stop.

11. The combination with a differential valve, of a supplemental chamber closed thereby, a stop for preventing the valve from closing, and a movable member operated by pressure in the supplemental chamber for operating said stop.

12. The combination with a differential valve, of a supplemental chamber closed thereby, a stop for preventing the valve from closing, a chamber communicating with the supplemental chamber, and a movable member in said chamber for operating said stop.

13. The combination with a valve, a stop for preventing the valve from closing, a chamber, a movable member in said chamber for operating said stop, and means for supplying a fluid under pressure to said chamber.

14. The combination with a valve, a stop for preventing the valve from closing, a chamber, a movable member in said chamber for operating said stop, a passage from said chamber to the atmosphere on one side of said movable member, and means for supplying a fluid under pressure to said chamber upon the other side of said movable member.

JONATHAN C. MELOON.

Witnesses:
W. H. THURSTON,
R. A. BATES.